US006979796B1

(12) United States Patent
Hardwick

(10) Patent No.: US 6,979,796 B1
(45) Date of Patent: Dec. 27, 2005

(54) METHOD AND APPARATUS FOR PROPER ALIGNMENT OF COMPONENTS IN A PLASMA ARC TORCH

(75) Inventor: Steven F. Hardwick, John's Island, SC (US)

(73) Assignee: InnerLogic, Inc., Charleston, SC (US)

(*) Notice: Subject to any disclaimer, the term of this patent is extended or adjusted under 35 U.S.C. 154(b) by 68 days.

(21) Appl. No.: 10/375,291

(22) Filed: Feb. 27, 2003

(51) Int. Cl.[7] .............................................. B23K 10/00

(52) U.S. Cl. ............... 219/121.48; 219/75; 219/121.51; 219/137.31

(58) Field of Search ......................... 219/121.48, 121.5, 219/121.51, 121.52, 121.59, 137.31, 74, 75, 121.49; 313/231.31, 231.41; 315/111.21

(56) References Cited

U.S. PATENT DOCUMENTS 5,233,154 A 8/1993 Horiai et al.
5,290,995 A * 3/1994 Higgins et al. ........ 219/121.44
5,796,067 A 8/1998 Enyedy et al.
5,841,095 A 11/1998 Lu et al.
5,886,315 A 3/1999 Lu et al.
6,346,685 B2 * 2/2002 Severance, Jr. et al. . 219/121.5
6,424,082 B1 7/2002 Hackett et al.
6,663,013 B1 * 12/2003 Vanden Heuvel et al. .... 239/83

OTHER PUBLICATIONS

Patent application 2002/0135283 A1, Sep. 26, 2002.

* cited by examiner

*Primary Examiner*—Mark Paschall
(74) *Attorney, Agent, or Firm*—Dority & Manning, P.A.

(57) ABSTRACT

A plasma arc torch includes at least one consumable component in coaxial relationship with another component of the torch. At least two compressible components are disposed between longitudinally extending coaxial surfaces of the consumable component and the second component. A pressurized medium flow path is directed to a longitudinal location between the compressible components. Upon supply of a pressurized medium through the flow path, the compressible components are caused to deform radially outward thereby centering the consumable component relative to the other component.

26 Claims, 4 Drawing Sheets

METHOD AND APPARATUS FOR PROPER ALIGNMENT OF COMPONENTS IN A PLASMA ARC TORCH

BACKGROUND

The present invention relates generally to the field of plasma arc torches, and more particularly to a system and method for ensuring proper alignment of components within a plasma arc torch.

The operation of conventional plasma arc torches is well understood by those skilled in the art. The basic components of these torches are a body, an electrode mounted within the body, a nozzle defining an orifice for a plasma arc, a source of ionizable gas, and an electrical supply for producing an arc in the gas. Upon start-up, an electrical current is supplied to the electrode (generally a cathode) and a pilot arc is initiated in the ionizable gas typically between the electrode and the nozzle (the nozzle defining an anode). Then, a conductive flow of the ionized gas is generated from the electrode to the work piece, wherein the work piece then becomes the anode, and a plasma arc is thus generated from the electrode to the work piece. The ionizable gas can be non-reactive, such as nitrogen, or reactive, such as oxygen or air.

An inherent drawback of plasma arc torches is that certain of the critical components wear out and must be replaced. Such components are commonly referred to as "consumable" components and include, for example, the electrode, nozzle, and swirl ring. Depending on the design of the torch, other components may also be subjected to wear and require periodic replacement. Unfortunately, the consumable components, particularly the nozzle and electrode, are made of expensive materials and must be machined to within relatively exact tolerances. Replacement of these consumable components represents a significant portion of the overall costs associated with plasma arc torch operations.

Upon replacement of the consumable products, it is imperative for proper operation of the torch that such components are correctly seated and aligned within the torch. Also, the useful life of the consumable products is directly affected by proper alignment of the components. A misaligned component will result in an inaccurate cut, subject the component to excessive wear, and will result in frequent replacement of the component.

In this regard, a significant effort has been made in the art towards systems and methods for improving proper alignment of components within a torch. For example, U.S. Pat. No. 6,424,082 and U.S. patent application Ser. No. 2002/0135283 A1 describe a system for improving component alignment by defining complimentary contoured surfaces between contacting components.

The '082 patent and '283 application allege that systems relying on O-rings for centering components and compensating for machining tolerances are ineffective because of substantial inherent variations in the molded cross-sectional profiles of O-rings.

The present invention relates to an improved system for aligning components, particularly consumable components, in a plasma arc torch resulting in increased life of the components and improved operation of the torch.

SUMMARY

Objects and advantages of the invention will be set forth in part in the following description, or may be obvious from the description, or may be learned through practice of the invention.

In accordance with aspects of the invention, a plasma arc torch is provided having at least one, and typically more than one, consumable component. Such consumable components are known by those skilled in the art of plasma arc torches and may include, for example, an electrode, a nozzle, etc. The consumable component is disposed concentric relative to another component of the torch with a radial space between the consumable component and the other component. In one embodiment, the consumable component is disposed concentric within the other component and the radial space may be defined by an intentional machined difference in the respective outer and inner diameters of the components, or an inherent difference resulting from machining tolerances between the consumable component and the other concentric component.

Longitudinally spaced apart compressible components are disposed in the radial space. In a particular embodiment, the compressible components are O-rings, or similar devices. The compressible components may be positively seated in either component, for example in a concentric groove defined in an outer circumferential surface of the consumable component or an inner circumferential surface of the other concentric component. In a particular embodiment, two longitudinally spaced apart O-rings are seated in respective grooves in the outer circumferential surface of the consumable component. The O-rings are disposed against a wall surface, such as an end wall of a respective groove. The wall surface may have a depth or height equal to or greater than a radius of the O-rings. A partition may be defined between the grooves having a depth or height the same as the wall surface against which the O-rings are disposed, or may have a different height. For example, in one embodiment, the partition is defined simply as a circumferential band of the exterior surface of the consumable component between two spaced apart O-ring grooves. In another embodiment, the partition may be a radially recessed area defined between O-ring seats so as to ensure a sufficient radial clearance between the two components.

A source of a pressurized medium is directed to the radial space between the compressible components. The pressurized medium may utilize the same type of gas as the ionizable gas used by the torch to create a plasma arc, or may be a different gas. The pressurized medium is at a sufficiently higher pressure than the ionizable gas to ensure deformation of the compressible components, as described in greater detail herein. The pressurized medium is directed by a flow path through one or more components of the torch to the radial space between the longitudinally spaced apart compressible components. For example, the pressurized medium flow path may include a port or channel through either component with an outlet between the spaced apart compressible components. In a particular embodiment, the compressible components are seated in grooves around the consumable component and the outlet is defined in the other radially spaced concentric component between the compressible components.

Upon supplying the pressurized medium, the compressible components are pushed longitudinally against a wall surface and caused to deform radially outward against an opposite concentric surface of the adjacent torch component. This action results in a centering of the consumable component relative to the other component. For example, if the consumable component is concentric within the other component, it will be centered coaxially within the other component.

The present invention also encompasses consumable components for use in a plasma arc torch. The consumable component is configured for receipt within a plasma arc torch in a concentric relationship with at least one other component of the torch. The consumable component includes an outer circumferential surface having a radius along at least a longitudinal portion thereof such that a radial space is defined between the outer circumferential surface and the other component of the torch upon insertion of the consumable component within the torch. Longitudinally spaced apart compressible components are disposed around the outer circumferential surface of the consumable component against a wall surface defined in the outer circumferential surface. The compressible components may be, for example, O-rings seated in grooves defined in the outer surface of the consumable component. A flow path for a pressurized medium is defined by the outer circumferential surface between the compressible components. The compressible components have a size and compressibility such that upon being subjected to a pressurized medium introduced to the flow path, the compressible components are pushed longitudinally against the wall surface and are caused to deform radially outward so as to hold the consumable component in position relative to the other concentric torch component.

Aspects of the invention will be described below in greater detail by reference to particular embodiments illustrated in the figures.

DETAILED DESCRIPTION

Reference will now be made in detail to embodiments of the invention, one or more examples of which are illustrated in the figures. Each embodiment described or illustrated herein is presented for purposes of explanation of the invention, and not as a limitation of the invention. For example, features illustrated or described as part of one embodiment may be used with another embodiment to yield still a further embodiment. It is intended that the present invention include these and other modifications and variations.

Figure 1:
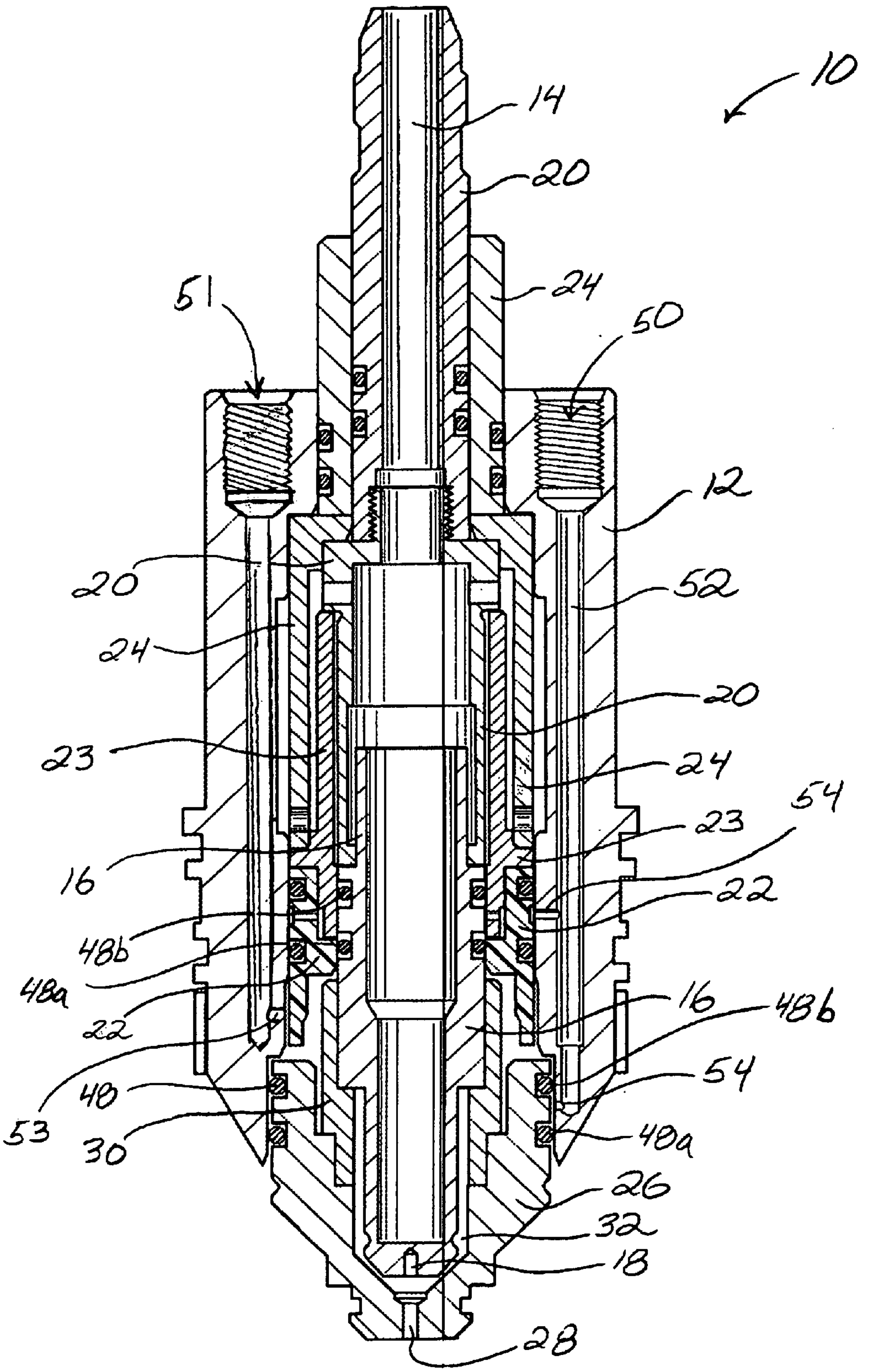
FIG. 1 is a cross-sectional view of an embodiment of a plasma arc torch in accordance with the invention.

FIG. 1 is a cross-sectional view of a plasma arc torch 10 incorporating aspects of the present invention. The torch 10 in its overall construction and operation is similar to a commercially available torch (FL 200) available from InnerLogic, Inc. of Charleston, S.C. USA. It should be appreciated, however, that the present invention for centering and aligning components within a plasma arc torch is not limited to any particular type of torch, and may be practiced by any manner of conventional torch, including torches of the type described in U.S. Pat. No. 5,070,227.

The operation of conventional arc torches is well understood by those skilled in the art and a detailed explanation thereof is not necessary for purposes of this disclosure. General structural and operational aspects of conventional arc torches are described below as reference and background for the present invention.

Referring to FIG. 1, the plasma arc torch 10 has a body 12 that initially functions as an anode body in an arc pilot mode of the torch. The body 12 includes a water cooling passage or chamber 14 that is supplied with a source of cooling water (not shown). An ionizable gas passage 51 is defined in the body 12 to supply a pressurized ionizable gas to the torch components. Typically, a remotely actuated valve, such as a solenoid valve, is disposed inline between the passage 51 and a pressurized gas source to shut off the supply of gas to the torch 10 upon actuation of the valve. As is appreciated by those skilled in the art, the plasma gas may be non-reactive, such as nitrogen, or reactive, such as oxygen or air.

The torch body 12 includes an electrode 16, typically formed from copper. An electrode insert or element 18 is fitted into the lower end of the electrode 16. The insert 18 is typically formed from hafnium or zirconium, particularly when a reactive gas is used as the plasma gas.

A cathode element 20 surrounds or defines the chamber 14. A rear insulating body component 24 surrounds a longitudinal portion of the cathode 20. Front insulating body components 22, 23 surround a longitudinal portion of the electrode 16, as depicted in FIG. 1 and understood by those skilled in the art.

A nozzle 26 is disposed at the forward end of the electrode 16 and defines an arc passageway 28 aligned with the electrode insert element 50.

A swirl ring 30 is disposed around a lower portion of the electrode 16 and has holes (not shown) defined therein to induce a swirling component to the plasma gas entering a plasma gas chamber 32 defined in the radial space between the nozzle 26 and electrode 16.

Certain outer structural components of the torch 10 are not illustrated in FIG. 1 for sake of clarity. These components are not critical to an understanding of the present invention and include, for example, a retaining cap assembly that fits over the nozzle 26, and a shield that fits over the retaining cap assembly. A handle adapter may be fitted over the retaining cap assembly, and so forth.

In operation, electrical current is supplied by a power supply to the electrode 16 and insert element 18. A negative power lead is in electrical communication with the cathode 20. In a pilot arc mode, a positive power lead is in electrical communication with the anode body 12 which is electrically isolated by the insulating bodies 22, 23, 24 from the cathode 20. A positive power lead is connected to a work piece that is to be cut by the torch. In operation, plasma gas flows from a source and into the passage 51. The plasma gas flows downward through the passage 51 and is directed through an outlet 53 to the plasma gas chamber 32. In operation, a differential pressure exists between the supply passage 51 and plasma gas chamber 32 so that the plasma gas flows from the supply passage 51, through the swirl ring 30, and out the passageway 28 defined in the nozzle 26 with a swirling component induced thereto.

In the pilot arc mode, the positive lead is connected to the anode body 12 and a pilot arc is initiated between the electrode insert 18 and nozzle 26. A desired plasma gas flow and pressure are set by the operator for initiating the pilot arc. The pilot arc is started by a spark or other means, such as a contact starting technique, all of which are known in the art.

In order to transfer the torch to a cutting mode, the torch is brought close to a work piece so that the arc transfers to the work piece, at which time positive power is supplied only to the work piece. Current is increased to a desired level for cutting such that a plasma arc is generated which extends through the arc passageway 28 to the underlying work piece. As the operational current is increased, the plasma gas within the plasma gas chamber 32 heats up and a decrease in plasma gas flow out of the nozzle 26 results. In order to sustain sufficient plasma gas flow through the nozzle 26 to sustain the plasma arc, pressure of the plasma gas supplied must be increased with the increase of current.

The operational principles described above are understood by those skilled in the art and a further detailed explanation thereof is not necessary for purposes of the present disclosure.

As mentioned, the present invention relates to a plasma arc torch incorporating a unique system for ensuring proper alignment of various components, particularly the relatively expensive consumable components. The invention also relates to consumable components incorporating aspects of the invention.

Figure 5:
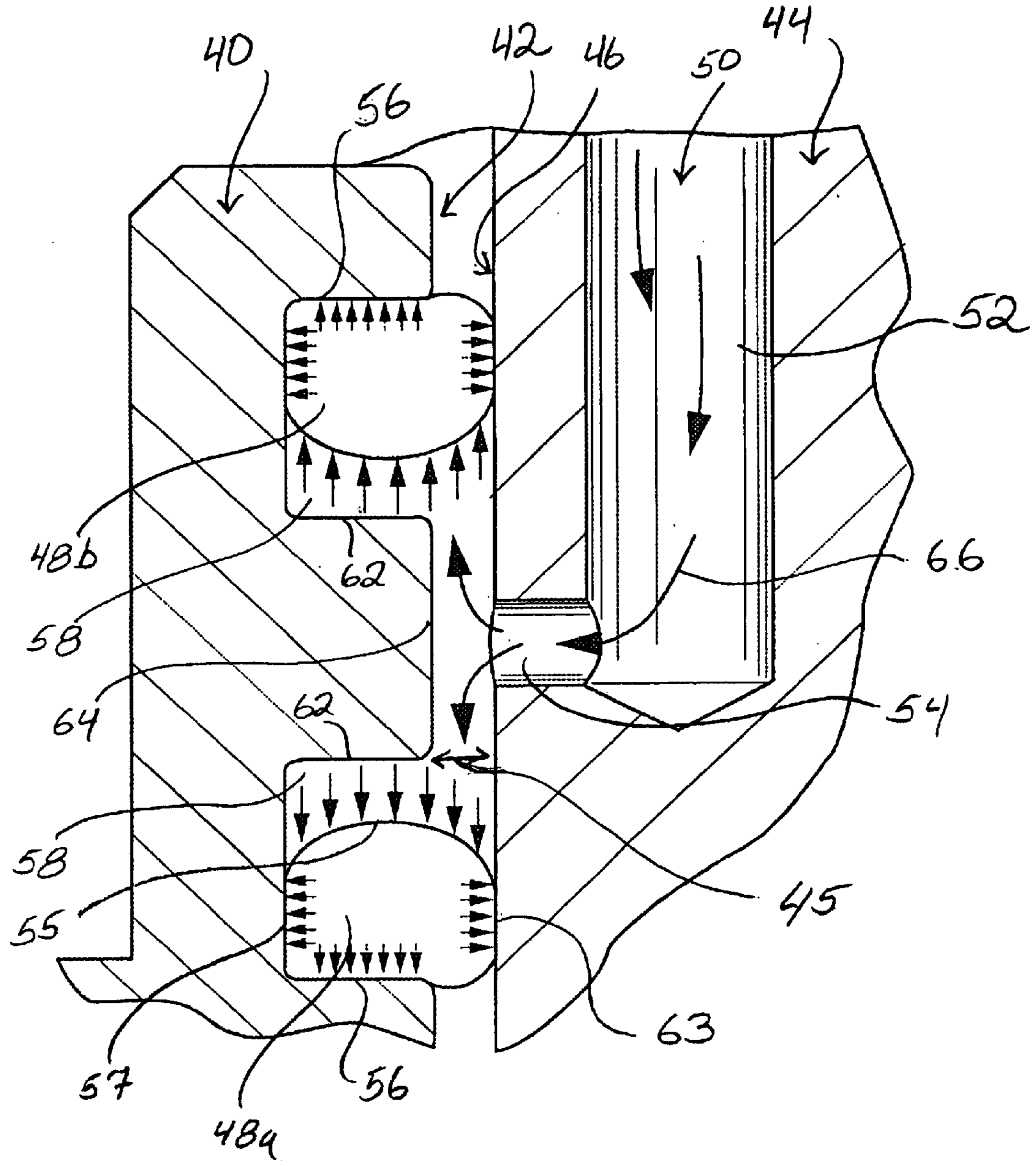
FIG. 5 is a conceptual operational view of the compressible components is accordance with the invention.

FIG. 5 conceptually illustrates aspects of the invention. A portion of a consumable component 40 is illustrated. The component 40 may be any component within the plasma arc torch that must be coaxially centered and aligned with another component. For example, the component 40 may be a nozzle, an electrode, etc. The component 40 has a first longitudinally disposed circumferential surface, a portion of this surface is illustrated in FIG. 5 as element 42. A portion of a second component 44 is also illustrated in FIG. 5 radially displaced by a distance 45 from the consumable component 40. The second component has a longitudinally extending surface 46 that is coaxial to the longitudinally extending surface 42 of the consumable component 40. The component 44 may be any component of the plasma arc torch that is in coaxial alignment with the consumable component 40. For example, in the embodiment wherein the consumable component 40 is the nozzle 26 (FIG. 1), the component 44 may be designated as the anode body 12, as is particularly illustrated in FIG. 1.

Still referring to FIG. 5, at least two compressible components 48*a*, 48*b* are disposed in the radial space 45 between the first and second longitudinally extending surfaces 42, 46, of the respective consumable component 40 and other component 44. The compressible components 48*a*, 48*b*, are longitudinally spaced apart and may be, for example, conventional O-rings, gasket-like devices, etc. A feature of the compressible components 48*a*, 48*b*, is that they are capable of deforming under pressure so as to expand radially outward into the radial space 45 between the consumable component 40 and other component 44, as described in greater detail below.

It should be appreciated that the compressible components 48*a*, 48*b*, may be positively seated in either of the components 40 or 44. In the illustrated embodiment, the compressible components 48*a*, 48*b*, are positively seated in grooves 58 defined circumferentially around the consumable component 40.

A pressurized medium flow path, generally 50, is provided so as to direct a pressurized medium to the radial space 45 at a longitudinal location between the compressible components 48*a*, 48*b*, as particularly illustrated in FIG. 5. In a particular embodiment, the pressurized medium flow path 50 may be defined, for example, by a passage 52 defined in the component 44. The passage 52 includes an outlet 54 located in the longitudinal surface 46 between the compressible components 48*a*, 48*b*. A pressurized medium 66 is thus directed through the passage 52 and out of the outlet 54 so as to flow longitudinally in the radial space 45, as is conceptually illustrated in FIG. 5. Referring to FIG. 1, the pressurized medium flow path 50 is illustrated as the passage 52 defined longitudinally within the anode body 12. A threaded fitting is illustrated as one means of connecting the pressurized medium flow path 50 with a source of pressurized gas.

The pressurized medium 66 is preferably a gas maintained at a pressure higher than the ionizable gas utilized by the torch 10. The gas 66 may be the same type of gas as the ionizable gas, or a different gas.

Still referring to FIG. 5, it can be seen that the compressible components 48*a*, 48*b* are seated so as to be in contact with a wall 56 or other like structure so that upon the pressurized medium 66 being directed into the radial space 45, the gas causes the compressible components 48*a*, 48*b*, to be forced against the respective walls 56 and to deform radially outward. The compressible components 48*a*, 48*b* will compress and deform to such an extent that a seal line 63 is established against the coaxial surface 46 of the component 44. Once an equilibrium is established, it should be appreciated that the compressible components 48*a*, 48*b*, thus serve to uniformly center and align the consumable component 40 coaxially within the other component 44 of the torch 10. It should be appreciated that the compressible components 48*a*, 48*b*, should have the same compressibility or hardness so that the centering force is generated equally at each longitudinally displaced position of the components 48*a*, 48*b*. It should also be appreciated that the pressurized medium 66 should be at a sustained pressure to ensure that a sufficient differential pressure is established across the compressible components 48*a*, 48*b*, to cause the components to deform to the desired extent. This differential pressure will be a function of the ionizable gas pressure and the hardness characteristics of the compressible components 48*a*, 48*b*, and may be empirically determined.

In the illustrated embodiments, the walls 56 against which the compressible components 48*a*, 48*b*, are pushed, are defined by distal walls of the groove 58. These distal walls 56 preferably have a depth that is at least as great as the relaxed radius of the compressible components 48*a*, 48*b*. Referring to the component 48*a* in FIG. 5, as the pressurized gas 66 is directed longitudinally within the radial space 45, the component 48*a* is acted upon at its proximal surface 55 by the gas 66 and is pushed in the direction of the wall 56. Because of the reaction surface 56 and reaction surface 57 defined by the floor of the groove 58, deformation of the component 48*a* is directed radially outward into the radial space 45. It should also be appreciated that the reaction surfaces or wall-like structures may also be defined by radially protruding ribs or ridges that are defined on the exterior circumferential surface of the component 40. In other words, the illustrated grooves are a suitable convenient method for positively seating the components 48*a*, 48*b*, but other embodiments are within the scope and spirit of the invention.

Still referring to FIG. 5, a partition 64 may be provided between the grooves 58. This partition 64 may have a depth that is generally equal to the distal walls 56 of the grooves 58, or may have a depth that is less than or greater than the height of the walls 56. In the illustrated embodiment, the partition 64 is defined by a longitudinal portion of the circumferential surface of the component 40. This surface may, however, be machined so that the radial space 45 is increased longitudinally between the compressible components 48*a*, 48*b*. This may be desired depending on the machine tolerances between the components 40, 44 to ensure that a sufficient radial space 45 is defined.

FIG. 1 is an embodiment of the present invention incorporating the conceptual features illustrated in FIG. 5 for centering and aligning the nozzle 26 relative to the anode body 12, and also for centering and aligning the electrode 16 with respect to the insulating body 22. Details of the centering and aligning systems are shown in FIGS. 2 through 4.

Figure 2:
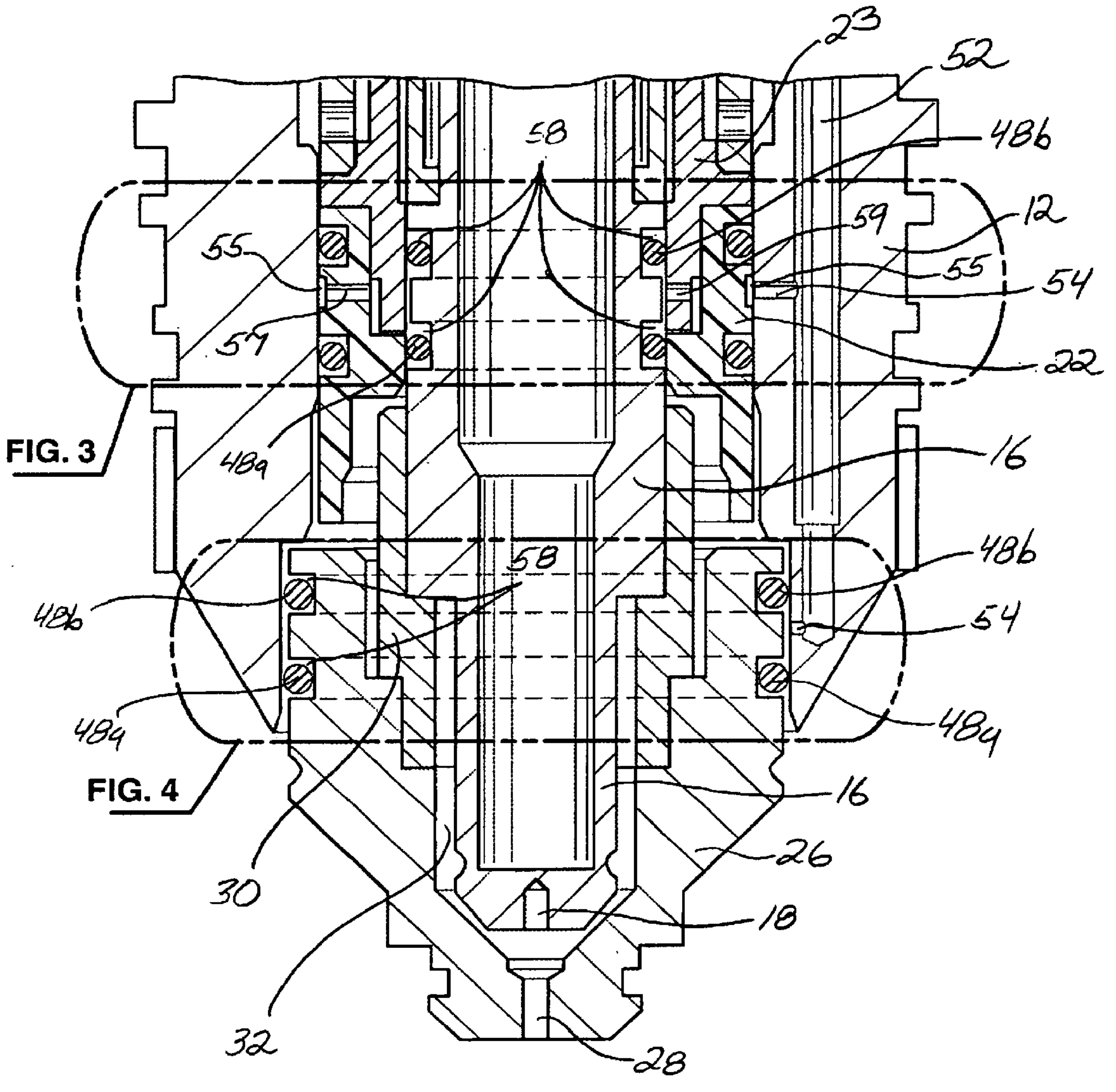
FIG. 2 is an enlarged cross-sectional view of portions of the embodiment illustrated in FIG. 1.
Figure 4:
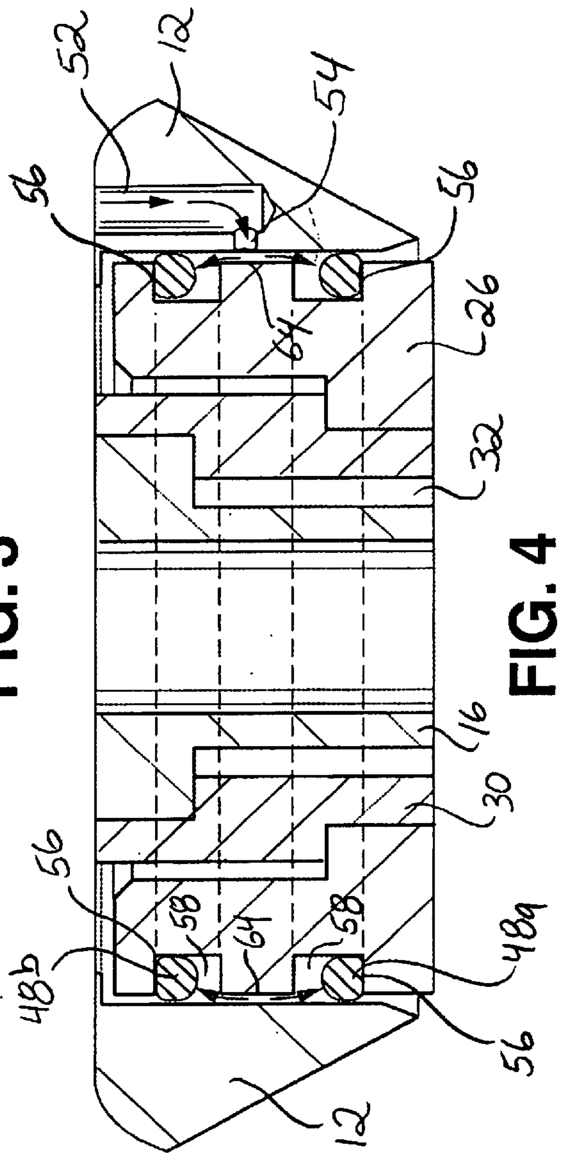
FIG. 4 is an enlarged cross-sectional view of the portion of the torch indicated in FIG. 2.

Referring to FIGS. 2 and 4, the system for centering and aligning the nozzle 26 with respect to the anode body 12 includes grooves 58 defined in the outer circumferential surface of the nozzle 26. The compressible components 48*a*, 48*b*, are seated within the grooves 58. This can be particularly seen in FIG. 4, the outlet 54 from the pressurized medium passage 52 is directed to the longitudinally extending radial space between the grooves 58. Upon supplying the pressurized medium 66, the compressible components 48*a*, 48*b*, are deformed as described above resulting in a relatively precise coaxial centering of the nozzle 26 with respect to the anode body 12.

It should be appreciated that the present invention separately encompasses the nozzle 26 apart from the torch 10, wherein the nozzle 26 is equipped for use in the centering system as described and claimed herein.

Figure 3:
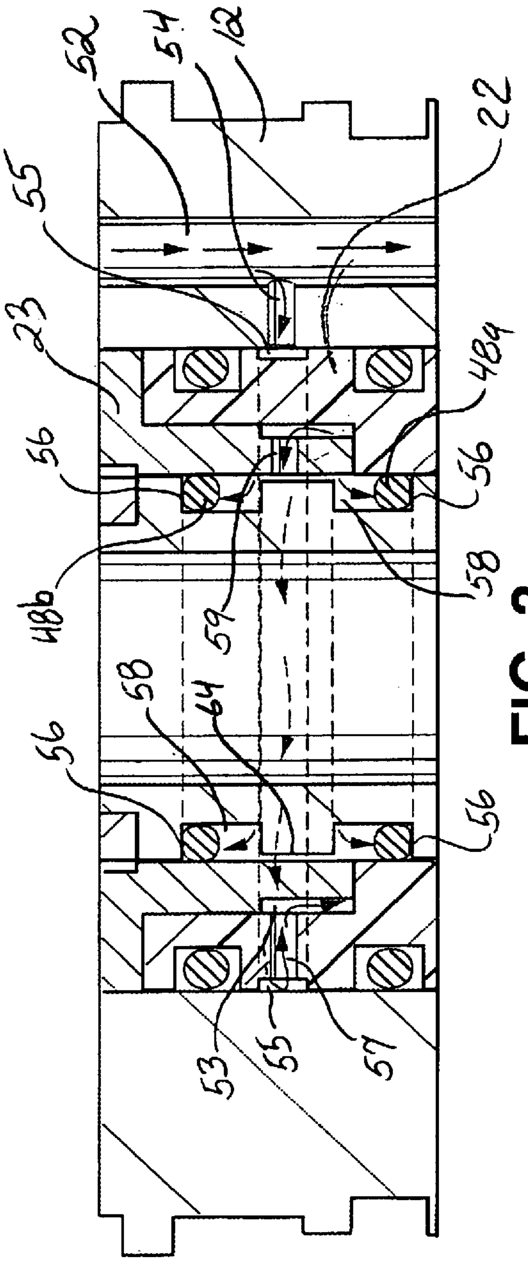
FIG. 3 is an enlarged cross-sectional view of the portion of the torch indicated in FIG. 2.

FIGS. 2 and 3 illustrate an exemplary centering and aligning system between the electrode 16 and the insulating body member 22. In this particular embodiment, the pressurized medium is directed from the passage 52 into an outlet 54. The outlet 54 is in communication with a concentric recess or groove 55 defined in the outer circumferential surface of the insulating body 22. As particularly seen in FIG. 3, the circumferential passage 55 is in communication with a radially extending passage 57 also defined in the insulating body 22. Passage 57 opens into a circumferential recess or passage 53 defined in the outer circumferential surface of the coaxial insulating body 23. A further radially directed outlet 59 is in communication with this passage 53 and serves to direct the pressurized medium into the longitudinally extending radial space defined between the compressible components 48*a*, 48*b*. In this particular embodiment, the partition 64 is illustrated as being machined with a radial depth slightly less than the distal walls 56 of the grooves 58 to ensure a sufficient radial clearance for the pressurized medium to act upon the compressible components 48*a*, 48*b*, as described above.

It will be apparent to those skilled in the art, that the unique centering and aligning system as described herein may be useful for proper positioning and alignment of any component within the torch 10. The invention, however, has particular usefulness for centering and aligning consumable components in that the life of such components may be significantly extended. For example, the invention may be used to prevent misalignment between the electrode and nozzle. Without proper alignment, the arc spot would not be centered on the hafnium element insert, resulting in substantially increased wear of the copper electrode casing. Thus, with the present invention, the frequency of replacement of these relatively expensive components is reduced and the overall cost of operating plasma arc torches is also reduced.

It will be apparent to those skilled in the art that modifications and variations can be made to the embodiments illustrated and described herein without departing from the scope and spirit of the invention as set forth in the appended claims and their equivalents.

What is claimed is:

1. A plasma arc torch, comprising:

at least one consumable component, said consumable component having a first longitudinally disposed circumferential surface;

a second component in a coaxial relationship with said consumable component, said second component having a second longitudinally extending surface generally opposite from said first longitudinally disposed surface;

at least two concentric compressible components disposed between said first and second longitudinally extending surfaces of said respective consumable component and said second component;

a pressurized medium flow path directed to a longitudinal location between said compressible components; and wherein upon supply of a pressurized medium through said flow path, said compressible components are caused to deform radially outward thereby centering said consumable component relative to said second component.

2. The plasma arc torch as in claim 1, wherein said compressible components comprise O-rings.

3. The plasma arc torch as in claim 1, wherein said consumable component is concentric within said second component, said first longitudinally extending surface comprising an outer circumferential surface of said consumable component.

4. The plasma arc torch as in claim 1, wherein said consumable component is one of an electrode and a nozzle.

5. The plasma art torch as in claim 1, wherein said compressible components are seated in a concentric groove defined in said first longitudinally extending surface, said pressurized medium flow path comprising an outlet disposed so as to direct the pressurized median in opposite longitudinal directions towards said compressible components.

6. The plasma arc torch as in claim 5, wherein said outlet is defined in said second longitudinally extending surface of said second component.

7. The plasma arc torch as in claim 5, wherein each of said compressible components is seated in a respective said groove, said grooves having opposite side walls of generally equal depth.

8. The plasma arc torch as in claim 7, wherein said side walls have a depth at least as great as a radius of said compressible components.

9. The plasma arc torch as in claim 1, further comprising a source of pressurized ionizable gas for generation of a plasma arc by said torch, and a separate source of a pressurized gas in communication with said flow path, said pressurized gas from said separate source at a higher pressure than said pressurized ionizable gas.

10. A plasma arc torch, comprising:

at least one consumable component, said consumable component having an outer circumferential surface with opposite longitudinally spaced apart walls;

at least two longitudinally spaced apart compressible components disposed around said outer circumferential surface, each of said compressible components disposed against a respective said wall;

a pressurized medium flow path directed to a longitudinal location between said compressible components; and wherein upon supply of a pressurized medium through said flow path, said compressible components are pressed against a respective said wall and caused to deform radially outward against a concentric surface of another component of said torch thereby centering said consumable component relative to said other component.

11. The plasma arc torch as in claim 10, wherein said compressible components comprise O-rings.

12. The plasma arc torch as in claim 11, wherein said O-rings are seated within grooves, said walls defined by longitudinally distal sides of said grooves, said pressurized medium flow path comprising an outlet disposed between said grooves.

13. The plasma arc torch as in claim 12, further comprising a partition disposed between said grooves.

14. The plasma arc torch as in claim 13, wherein said partition has a height at least as great as said longitudinally distal walls of said grooves.

15. The plasma arc torch as in claim 10, wherein said consumable component is one of an electrode and a nozzle.

16. A plasma arc torch, comprising:

at least one consumable component, said consumable component disposed concentric within another component of said torch with a radial space between said consumable component and said other component;

a pressurized medium source directed to said radial space; and at least one compressible component disposed in said radial space, said compressible component having a size and compressibility so as to deform radially outward upon being subjected to said pressurized median causing said consumable component to be held in position relative to said other component.

17. The plasma arc torch as in claim 16, wherein said compressible component comprises an O-ring.

18. The plasma arc torch as in claim 17, wherein said compressible component is seated within a groove defined around an outer circumferential surface of said consumable component.

19. The plasma arc torch as in claim 17, comprising at least two said O-rings longitudinally spaced apart in said radial space, said pressurized medium source directed to said radial space between said O-rings.

20. A consumable component of a plasma arc torch, said consumable component configured for receipt within a plasma arc torch in a concentric relationship with at least one other component of the torch, said consumable component comprising:

an outer circumferential surface having a radius such that a radial space is defined between said outer circumferential surface and the other component of the torch upon insertion of said consumable component within the torch;

longitudinally spaced apart compressible components disposed around said outer circumferential surface, each said compressible component disposed against a wall surface defined in said outer circumferential surface;

a flow path for a pressurized medium defined by said outer circumferential surface between said compressible components; and wherein said compressible components have a size and compressibility such that upon being subjected to a pressurized medium introduced to said flow path, said compressible components deform radially outward so as to hold said consumable component in position relative to the other concentric torch component.

21. The consumable component as in claim 20, wherein said compressible components comprise O-rings.

22. The consumable component as in claim 20, comprising a grooves defined in said outer circumferential surface, said compressible components seated within said grooves, said wall surfaces defined by said side walls of said grooves.

23. The consumable component as in claim 22, comprising a partition between said grooves, said partition having a height generally equal to a height of said wall surfaces.

24. The consumable component as in claim 22, comprising a partition between said grooves, said partition having a height generally less than a height of said wall surfaces.

25. The consumable component as in claim 20, wherein said consumable component is a nozzle.

26. The consumable component as in claim 20, wherein said consumable component is an electrode.

* * * * *